US008889257B2

(12) United States Patent
Rolison et al.

(10) Patent No.: US 8,889,257 B2
(45) Date of Patent: Nov. 18, 2014

(54) $RUO_2$-COATED FIBROUS INSULATOR

(75) Inventors: Debra R Rolison, Arlington, VA (US); Jeffrey W Long, Alexandria, VA (US); Christopher N. Chervin, Arlington, VA (US); Justin C Lytle, Tacoma, WA (US); Katherine A. Pettigrew, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 609 days.

(21) Appl. No.: 12/245,978

(22) Filed: Oct. 6, 2008

(65) Prior Publication Data

US 2009/0092834 A1    Apr. 9, 2009

Related U.S. Application Data

(60) Provisional application No. 60/977,685, filed on Oct. 5, 2007.

(51) Int. Cl.
*B32B 9/00* (2006.01)
*B05D 1/18* (2006.01)
*H01B 1/02* (2006.01)
*C01G 55/00* (2006.01)
*C23C 18/12* (2006.01)
*H01M 4/13* (2010.01)
*H01M 8/02* (2006.01)

(52) U.S. Cl.
CPC ......... *C23C 18/1216* (2013.01); *C23C 18/1225* (2013.01); *C23C 18/1245* (2013.01); *C23C 18/1283* (2013.01); *H01M 4/13* (2013.01); *H01M 8/0236* (2013.01)
USPC ..................... 428/389; 427/443.2; 252/521.3; 423/22; 423/59

(58) Field of Classification Search
USPC .................................. 252/521.3; 423/22, 592
See application file for complete search history.

(56) References Cited

U.S. PATENT DOCUMENTS 3,852,175 A   12/1974   Hoekje
4,737,257 A    4/1988   Boulton et al.
(Continued)

FOREIGN PATENT DOCUMENTS

WO         03069711      8/2003
WO    2007137794 A1    12/2007

OTHER PUBLICATIONS

Sankar et al. "Low temperature chemical vapor deposition of Ruthenium and Ruthenium dioxide on polymer surfaces", J. Mater. Chem., 1999, 9, 2439-2444.*

(Continued)

*Primary Examiner* — Jeremy R. Pierce
*Assistant Examiner* — Ricardo E Lopez
(74) *Attorney, Agent, or Firm* — US Naval Research Laboratory; Joseph T. Grunkemeyer

(57) ABSTRACT

An article having: a nonconductive fiber and a $RuO_2$ coating. A method of: immersing a nonconductive article in a solution of $RuO_4$ and a nonpolar solvent at a temperature that is below the temperature at which $RuO_4$ decomposes to $RuO_2$ in the nonpolar solvent in the presence of the article; and warming the article and solution to ambient temperature under ambient conditions to cause the formation of a $RuO_2$ coating on a portion of the article. An article having: a nonconductive fiber and a coating. The coating is made by electroless deposition, sputtering, atomic-layer deposition, chemical vapor deposition, or physical vapor deposition.

16 Claims, 6 Drawing Sheets

(56) References Cited

U.S. PATENT DOCUMENTS

| | | | |
|---|---|---|---|
| 5,306,555 A * | 4/1994 | Ramamurthi et al. | 442/63 |
| 5,487,918 A | 1/1996 | Akhtar | |
| 6,099,704 A | 8/2000 | Bacquet et al. | |
| 6,290,880 B1 | 9/2001 | Ryan et al. | |
| 6,649,091 B2 * | 11/2003 | Ryan et al. | 252/521.3 |
| 2003/0161959 A1 * | 8/2003 | Kodas et al. | 427/376.2 |
| 2003/0217642 A1 * | 11/2003 | Pasic et al. | 96/44 |
| 2011/0091723 A1 | 4/2011 | Long et al. | |

OTHER PUBLICATIONS

Agarwal et al., "Conductive wood microfibres for smart paper through layer-by-layer nanocoating" Nanotechnol., 17, 5319-5323 (2006).

Ahn et al., "Electroless coating of tungsten oxide on the surface of copper powder" Mater. Res. Bull., 43, 2266-2271 (2008).

Bhat et al., "Development of Conductive Cotton Fabrics for Heating Devices" J. Appl. Polym. Sci., 102, 4690-4695 (2006).

Biener et al., "Ruthenium/aerogel nanocomposite via atomic layer deposition" Nanotechnology, 18, 055303 (2007).

Caruso et al., "Titanium dioxide tubes from sol-gel coating of electrospun polymer fibers" Adv. Mater., 13, 1577-1579 (2001).

Chervin et al., "Converting $SiO_2$ fiber paper into metallic conducting, electrocatalytically active flexible electrodes by deposition of $RuO_2$ nanowebs" Presentation at 212th Meeting of the Electrochemical Society, Washington, DC (Oct. 7-12, 2007).

Clemons et al., "Modeling, simulation, and experiments of coating growth on nanofibers" J. Appl. Phys., 103, 044304 (2008).

Dhawan et al., "Thin conducting polypyrrole film on insulating surface and its applications" Bull. Mater. Sci., 16, 371-380 (1993).

Luo et al., "Atmospheric pressure MOCVD of thin Fe films on carbon fibers" Chem. Vap. Dep., 13, 574-580 (2007).

Lytle et al., "The importance of combining disorder with order for Li-ion insertion into cryogenically prepared nanoscopic ruthenia" J. Mater. Chem., 17, 1292 (2007).

Niskanen et al., "Radical enhanced atomic layer deposition of titanium dioxide" Chem. Vap. Dep., 13, 152-157 (2007).

Ryan et al., "Electronic connection to the interior of a mesoporous insulator with nanowires of crystalline $RuO_2$" Nature, 406, 169-172 (2000).

Yuan et al., "Low-temperature chemical-vapor-deposition of ruthenium dioxide from ruthenium tetroxide—a simple approach to high-purity $RuO_2$ films" Chem. Mater., 5, 908-910 (1993).

PCT Search Report and Written Opinion.

* cited by examiner

RUO₂-COATED FIBROUS INSULATOR

This application claims the benefit of U.S. Provisional Patent Application No. 60/977,685, filed on Oct. 5, 2007. The provisional application and all other publications and patent documents referenced throughout this nonprovisional application are incorporated herein by reference.

FIELD OF THE INVENTION

The invention is generally related to $RuO_2$ and other coatings on fibers.

DESCRIPTION OF RELATED ART

Ruthenium dioxide ($RuO_2$), one of the platinum group metal oxides, is an important industrial material due to its metallic electronic conductivity ($\sigma=10^4$ S cm$^{-1}$ at 25° C.), excellent chemical and thermal stability, and diffusion barrier properties (Trasatti, Physical electrochemistry of ceramic oxides. *Electrochim. Acta*, 36, 225-241 (1991)). The conductivity can depend on the crystalline form (Creutz et al., *J. Phys. Chem. B*, 107, 6668 (2003)). Hydrous ruthenium oxide (normally designated as $RuO_xH_y$ or $RuO_2.H_2O$) is a mixed electron-proton conductor that exhibits large proton capacitances (~720 F g$^{-1}$ proton$^{-1}$) (Zheng et al., A new charge storage mechanism for electrochemical capacitors. *J. Electrochem. Soc.*, 142, L6-L8 (1995)). It has recently been recognized that nanoscopic anhydrous $RuO_2$ exhibits high values of Li-ion uptake (~260 mA h g$^{-1}$) as a function of its degree of microstructural disorder (Lytle et al., The importance of combining disorder with order for Li-ion insertion into cryogenically prepared nanoscopic ruthenia. *J. Mater. Chem.*, 19, 1292-1299 (2007)). These characteristics have led to the use of ruthenium dioxide in electrodes for such applications as catalysis, electrolysis, photovoltaic devices, capacitors, and thick and thin film resistors.

Many chemical vapor deposition (CVD) techniques have been developed that form dense $RuO_2$ films on flat substrates, including: sputtering or evaporating ruthenium metal in the presence of oxygen; plasma decomposition of Ru-bearing gases by glow discharge; and thermal or photolytic decomposition of organometallic precursors (Ardizzone et al., Interfacial properties of oxides with technological impact in electrochemistry. *Adv. Colloid Interf. Sci.*, 64, 173-251 (1996)). Ruthenium dioxide films have been formed by activating oxygen gas and evaporated ruthenium vapor with direct current or radio-frequency radiation (Bunshah et al., U.S. Pat. No. 5,055,319). The deposition of $RuO_2$ via the reductive decomposition of $RuO_4$ from aqueous or nonaqueous solutions, pure solid, or vapor creates micrometer-thick $RuO_2$ films with resistivities of ~$10^{-2}$ Ω cm (Yuan et al., Low-temperature chemical-vapor-deposition of ruthenium dioxide from ruthenium tetroxide—a simple approach to high-purity $RuO_2$ films. *Chem. Mater.*, 5, 908-910 (1993))

Because of the high cost of ruthenium precursors, it is desirable to minimize the amount of $RuO_2$ required for a particular function, for example by preparing $RuO_2$ in nanoscale, high-surface-area forms to maximize the number of reaction sites for catalytic and sensing applications. Conventionally, micro- and nanostructured $RuO_2$ electrodes are prepared by modifying the surface of a substrate via dip-coating in or painting on a $RuCl_3$ solution followed by heating in air to oxidatively decompose the salt to $RuO_2$. Nanoscopic $RuO_2$ colloids have also been self-wired onto mesoporous silica aerogel substrates via cryogenic deposition (Ryan et al., U.S. Pat. Nos. 6,290,880 and 6,649,091), in which a precursor solution of $RuO_4$ in a nonpolar solvent (pentane) is equilibrated with a $SiO_2$ aerogel substrate at dry ice/acetone bath temperatures and allowed to gradually warm to room temperature bringing about the decomposition of $RuO_4$ to a self-organized, interconnected array of $RuO_2$ that provides an electronic pathway through the insulating silica aerogel scaffold (Ryan et al., Electronic connection to the interior of a mesoporous insulator with nanowires of crystalline $RuO_2$. *Nature*, 406, 169-172 (2000)).

The $RuO_2$—$SiO_2$ aerogel composites are high-surface-area electrode materials with weight loadings of $RuO_2$>20 wt %, but it is challenging to make quality contacts from the rigid and fragile composites to other solid-state materials. Furthermore, repeated immersion in solvents can cause collapse of the aerogel pore structure (as may occur in applications such as electrochemical production of chlorine ($Cl_2$) via the chloralkali process), thereby diminishing the surface area. Significant manufacturing costs may be associated with producing the aerogel substrates.

SUMMARY OF THE INVENTION

Disclosed herein is an article comprising: a nonconductive fiber; and a $RuO_2$ coating on a portion of the fiber.

Also disclosed herein is a method comprising: immersing a nonconductive article in a solution of $RuO_4$ and a nonpolar solvent at a temperature that is below the temperature at which $RuO_4$ decomposes to $RuO_2$ in the nonpolar solvent in the presence of the article; and warming the article and solution to ambient temperature under ambient conditions to cause the formation of a $RuO_2$ coating on a portion of the article.

Also disclosed herein is an article comprising: a nonconductive fiber; and a coating on a portion of the fiber; wherein the coating is made by electroless deposition, sputtering, atomic-layer deposition, chemical vapor deposition, or physical vapor deposition.

BRIEF DESCRIPTION OF THE DRAWINGS

A more complete appreciation of the invention will be readily obtained by reference to the following Description of the Example Embodiments and the accompanying drawings.

Cyclic voltammograms in 0.5 M $H_2SO_4$ at 2 mVs$^{-1}$ vs SSCE with a Pt counter electrode of $RuO_2\|SiO_2$ membranes previously calcined in air at: (dashed) 100° C.; (dotted) 150° C.; (solid) 200° C.

Figure 5:
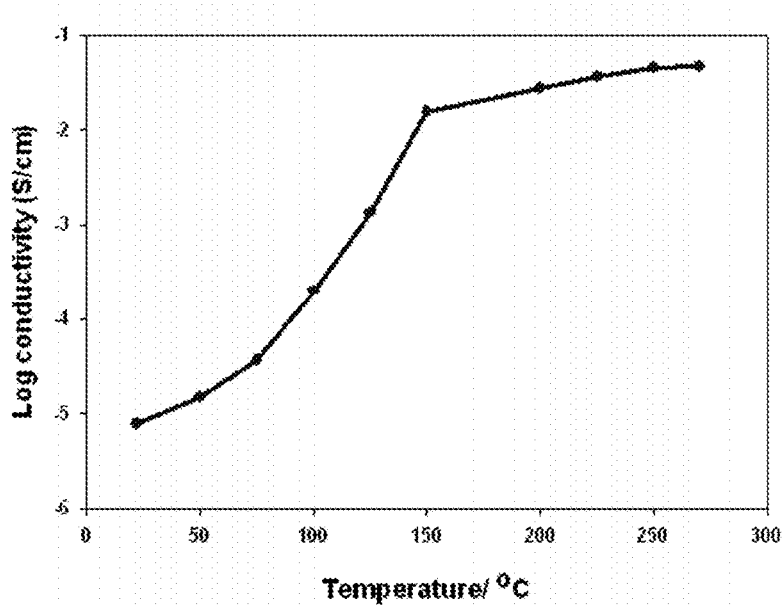

FIG. 5 shows conductivity as a function of calcination temperature.

Figure 6:
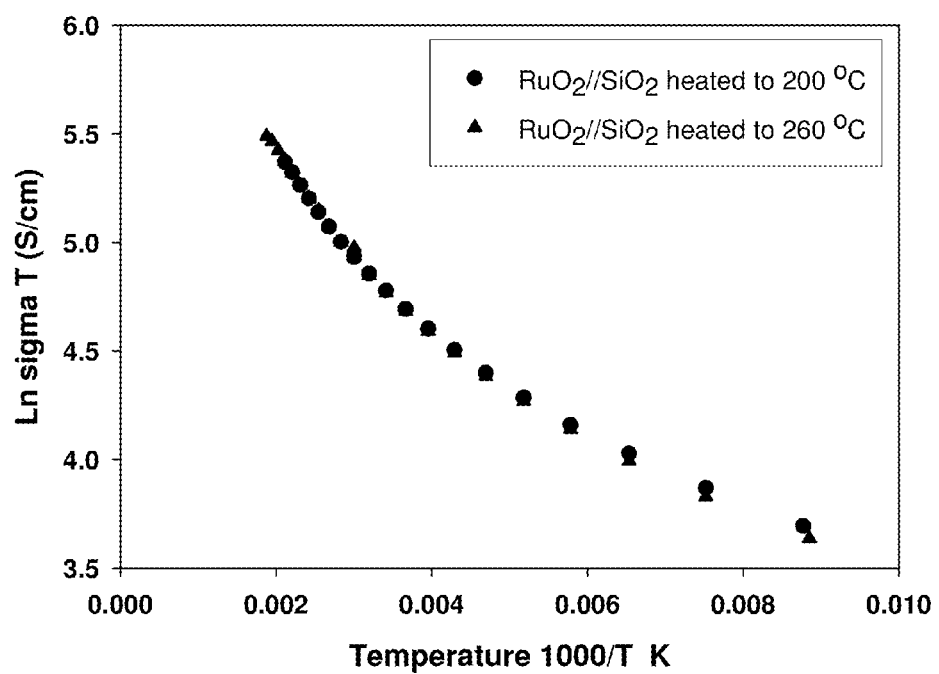

FIG. 6 shows four-point probe conductivity of 200° C.-calcined $RuO_2\|SiO_2$ composites.

Figure 7:
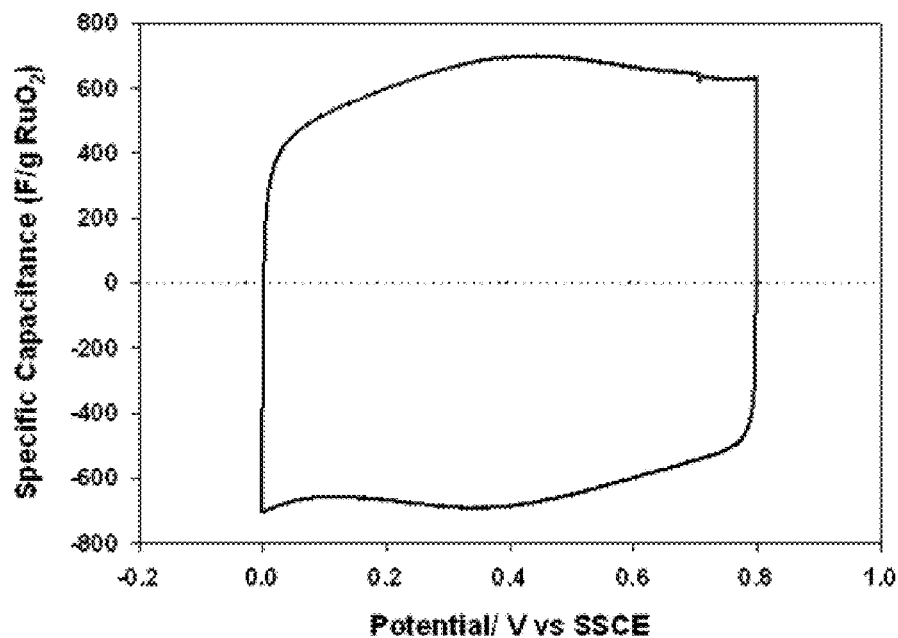
Figure 8:
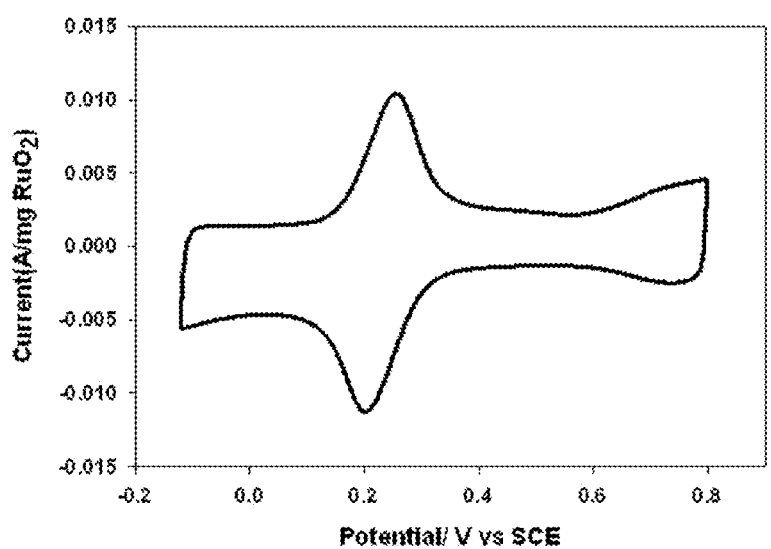

FIG. 7 shows a typical cyclic voltammogram in sulfuric acid for a 200° C.-calcined $RuO_2\|SiO_2$ composite FIG. 8 shows a typical voltammogram at 200° C.-calcined $RuO_2\|SiO_2$ composites in aqueous 5 mM ferricyanide.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Described herein is a method to fabricate lightweight, flexible, electrically conductive nanocomposites of ruthenium dioxide deposited on a silica fiber membrane. The resulting nanocomposite may have a low weight percentage and volume fraction of $RuO_2$, but may demonstrate the metallic conductivity and electrocatalytic activity associated with bulk $RuO_2$ materials.

A multifunctional, flexible electrode may be produced by converting inexpensive silica fiber paper into a conductive platform via cryogenic deposition of nanoscale $RuO_2$ coatings. The $RuO_2$-coated filter paper ($RuO_2\|SiO_2$) can exhibit high electronic conductivity and desirable electrochemical properties, but does so at low mass loadings (~300 μg cm$^{-2}$), thereby improving the utilization of this expensive platinum-group metal. The conductive nanoscopic coating can be air- and water-stable and readily functionalized to increase or vary the catalytic activity. The macroscopic properties of the lightweight $SiO_2$ substrate, i.e., flexibility, compressibility, and robustness, may be retained as the ruthenia-imparted electronic, electrochemical, and electrocatalytic functions are added. This material has potential for use as an electrode platform for important technological applications, including as gas-diffusion electrodes for fuel cells (when modified with an electrocatalyst, such as Pt), conductive membranes, and as multifunctional platforms for electrocatalysis/photocatalysis.

This inexpensive, practical manifestation on the macroscale of a conductor on the nanoscale is an adaptation of a method for wiring the interior of silica aerogels, based on the nonaqueous cryogenic decomposition of $RuO_4$ to $RuO_2$ (Ryan, et al., *Nature*, 406, 169 (2000)). The $RuO_2$-coated $SiO_2$ architecture combines the high surface area and mesoporosity of the aerogel with the electronic properties of the self-wired $RuO_2$ nanoweb, but high weight loadings are necessary to form the conducting network (>20 wt %), and the resultant monolithic objects have relatively low geometric-factor-normalized electrical conductivity (500 μS cm$^{-1}$). Furthermore, the cost of producing aerogel monolithic substrates and their fragile nature present additional challenges to commercialization and application.

To produce a substrate that may be more robust, flexible, and inexpensive, an electrically conductive network of $RuO_2$ is deposited onto commercially available silica fiber membranes (filter paper) as a fiber scaffold. The membranes may have a thickness of ~200 μm and may be composed of sub-micron-to-micron diameter silica fibers. Macroporous voids, which may be 100 s of nanometers to several micrometers, between the fibers offer headspace for the deposition of nanoscopic $RuO_2$ and for facile infiltration by fluids. In addition to achieving macroscopic physical properties associated with the $SiO_2$ substrate, dramatic improvements may be observed in electrical and electrochemical properties and remarkable physical behavior related to the $RuO_2$ nanoscale coating that forms on the $SiO_2$ fibers. The electronic conductivity of the $RuO_2\|SiO_2$ composite may be three orders of magnitude higher than that of the $RuO_2$-nanowired aerogel and is achieved with a significant reduction in the weight loading of $RuO_2$ (5% vs ~40%). The compressible and flexible nature of the filter paper substrate allows for excellent electrical contact with rough and curved surfaces, a feature not possible with rigid substrates such as an aerogel. The $RuO_2\|SiO_2$ composites are also tolerant to immersion into (and removal from) liquid phases, including water, allowing for solution-based modification and extended operation (and recovery) when used as an electrode structure.

The silica fiber membranes described here have markedly different morphological and physical properties than the silica aerogels described in U.S. Pat. Nos. 6,290,880 and 6,649,091. The $SiO_2$ aerogels had a three-dimensional mesoporous network (pores sized<50 nm) with a large surface area (~400-500 m$^2$ g$^{-1}$) and a solid phase composed of networked $SiO_2$ nanoparticles. In contrast, the $SiO_2$ fiber membranes may be macroporous (pores sized>50 nm) with a very low surface area (on the order of<1 m$^2$ g$^{-1}$) and maybe composed of submicron-to-micron-sized $SiO_2$ fibers. The differences in macroscopic physical properties of the two materials are quite significant. The aerogel is rigid and cannot be flexed without shattering, whereas the $SiO_2$ fiber membranes are flexible and can be easily molded to form quality electronic contacts with uneven surfaces. The $SiO_2$ fiber paper also has a degree of compressibility (softness) that helps in forming electronic contacts with other materials through pressure. This flexibility and compressibility is not possible with $SiO_2$ aerogels.

Synthesis of the $RuO_2\|SiO_2$ composite is far simpler than described for aerogel substrates, namely the time for equilibration and $RuO_2$ deposition may be <1 day rather than a week and may be carried out in ambient atmosphere rather than on a Schlenk line. The silica filter paper turns black after $RuO_2$ deposition with a mass uptake typically of 7 wt %. Upon heating the sample in air to 200° C. to crystallize the cryogenerated ruthenia (Lytle et al., *J. Mater. Chem.*, 17, 1292 (2007)), the mass loading drops to 5 wt %, concomitant with removal of organic byproducts, as we previously observed for unsupported cryogenically prepared $RuO_2$ powder. The weight loading of $RuO_2$ in the calcined composite was verified by commercial elemental analysis by ICP-AES.

Ruthenia nanowebs are cryogenically deposited on both $SiO_2$ aerogel and fiber membrane substrates, but the electronic and physical properties of the resultant materials are significantly different. The $RuO_2$—$SiO_2$ aerogels, with $RuO_2$ weight loadings of ~40 wt %, display conductivities on the order of 0.5 mS cm$^{-1}$ whereas the $RUO_2\|SiO_2$ fiber membranes, having $RuO_2$ weight loading of 5-10 wt %, may display conductance on the order of 500 mS cm$^{-1}$. Additionally, increasing the calcination temperature of the $RuO_2$~$SiO_2$ aerogel above ~200° C. leads to a decrease in electrical conductivity, presumably due to grain-size coarsening. The $RuO_2\|SiO_2$ fiber membranes may show an optimum in conductivity when calcined to 200-250° C., thereby demonstrating higher temperature stability and range of operation. The higher conductance observed for the $SiO_2$ fiber membrane is remarkable considering the lower weight loading and small volume of $RuO_2$. The $RuO_2$ phase may be constrained to a nanoscale coating yet the material may display high conductivity as if the $RuO_2$ wires had a geometric factor of micrometers in diameter (as do the silica fibers onto which the cryogenerated ruthenia deposits). Additionally, the $RuO_2$∥$SiO_2$ fiber membranes show increased $RuO_2$ mass-normalized catalytic activity for chloride oxidation over the $RuO_2$-$SiO_2$ aerogels, and it is proposed to use these composites as stand-alone, porous Li-ion insertion electrodes that are moldable for three-dimensional microbatteries, in which the electrode and electrolyte/separator phases are interpenetrated in three dimensions.

The ultrathin $RuO_2$ shell that coats the fibers comprising the $SiO_2$ paper closes on itself to create an imperfect, but contiguous electron path around the circumference and along the axis of the curved insulator. The conductive nanoscopic skin of $RuO_2$ expresses electron transport that mimics the size of the large, insulating object around which it wraps. In this way, electron transport in the $RuO_2$∥$SiO_2$ coaxial arrangement appears analogous to the plasmonic character of gold-coated silica spheres. In Au∥silica core-shell composites, the surface plasmon resonance tracks correlates to the inner and outer diameter of the Au shell, thereby tracking the diameter of the silica spherical core. Unlike metal nanoparticles, the plasmon resonance is not determined solely by the characteristic width of the metal.

The prior cryogenic deposition of $RuO_2$ has been modified to simplify the process. The original synthesis was carried out under vacuum on a Schlenk line and required a purification step for the pentane precursor. It was also necessary to phase-equilibrate the aerogel substrate with pentane in order to prevent damaging the mesoporous structure. The $SiO_2$ fiber membrane has a macroporous structure that is not sensitive to solvent infiltration or evaporation and the reaction can be run at ambient pressure. Petroleum ether has been substituted as a solvent and it is not necessary to purify the petroleum ether beforehand. These new materials may be easier to process on a larger scale at a greatly reduced cost of fabrication.

The disclosed $RuO_2$ coating method may be performed on any nonconductive article. By "nonconductive" is meant that the electrical conductivity is low enough that it is considered in the art to be nonconductive. For example, the material conductivity may be less than about $10^{-9}$ S/cm and/or the bulk conductivity may be less than about $10^{-12}$ S/cm. The article may be in the form of a fiber or thread, being an elongated, flexible, and relatively small diameter object. Small diameters include, but are not limited to, submicron size to tens of microns. The article may comprise a plurality of entangled fibers, meaning that the fibers form a cohesive mass. The entangled fibers may be in the form of a woven or non-woven sheet, such as a membrane or fiber-formed paper. Such a membrane or paper may be flexible while retaining its cohesiveness. The entangled fibers may also form a more three-dimensional, non-sheet article.

Any nonconductive fibers may be used including, but are not limited to, polymer, ceramic, and glass. The fibers may comprise or be entirely silica glass ($SiO_2$), such as in a silica fiber membrane. Such membranes are commercially available and are generally used as filters. The membranes may have fibers up to about 10 microns in diameter. The fibers in the membrane may have a wide range of diameters, or they may be monofilaments, having a range of diameter that deviates from the average by no more than about 5%. The diameter and length of the fibers may be adjusted to tune the electrical properties of the article.

The article has a $RuO_2$ coating on a portion of the article, which may include the entire article. The $RuO_2$ coating may be formed by the methods disclosed herein or any other method that produces the coating. The coating need not entirely cover all of the fiber or fibers. However, the coating may cover enough of the fiber or fibers such that the $RuO_2$ forms an electrically connected network throughout the article. The network has the effect of increasing the bulk electrical conductivity of the article. A bulk conductivity of at least about 500 mS/cm may be achieved when the article contains only up to 10 wt % $RuO_2$. The coating may have an average thickness of up to about 10 nm. This average thickness does not include non-coated portions of the fiber or fibers. The thickness and $RuO_2$ loading may be adjusted to tune the electrical properties of the article.

The article may also have a second material deposited on the $RuO_2$ coating, such as a metal, metal oxide, polymer, molecular or ionic species or ceramic. The deposited material may be electrophoretically deposited, where the deposited material acts as an oxidant while $RuO_2$ acts as a reductant. (The phrase "metal, metal oxide, ceramic, or platinum" may refer to the material in pre-deposit or post-deposit form.) One suitable material is platinum.

The same fibrous articles may also be made with other coatings besides $RuO_2$. Any coating that may be made by electroless deposition, sputtering, atomic-layer deposition, chemical vapor deposition, physical vapor deposition, atomic layer deposition, or sol-gel methods may be deposited on the fiber or fibers. The morphology and dimensions of the coating and electrical properties of the article may be the same or different from those of $RuO_2$ depending on the material used. Suitable coating materials and methods are disclosed in A. Niskanen et al., Radical enhanced atomic layer deposition of titanium dioxide. *Chem. Vap. Dep.*, 13, 152-157 (2007); J.-H. Luo et al., Atmospheric pressure MOCVD of thin Fe films on carbon fibers. *Chem. Vap. Dep.*, 13, 574-580 (2007); C. B. Clemons et al., Modeling, simulation, and experiments of coating growth on nanofibers. *J. Appl. Phys.*, 103, 044304 (2008); R. A. Caruso et al., Titanium dioxide tubes from sol-gel coating of electrospun polymer fibers. *Adv. Mater.*, 13, 1577-1579 (2001); J-H Ahn et al., Electroless coating of tungsten oxide on the surface of copper powder. *Mater. Res. Bull.*, 43, 2266-2271 (2008); J. Biener et al., Ruthenium/aerogel nanocomposite via atomic layer deposition. *Nanotechnololgy*, 18, 055303 (2007); Dhawan et al., "Thin conducting polypyrrole film on insulating surface and its applications" *Bull. Mater. Sci.*, 16, 371-380 (1993); Bhat et al., "Development of Conductive Cotton Fabrics for Heating Devices" *J. Appl. Polym. Sci.*, 102, 4690-4695 (2006); Agarwal et al., "Conductive wood microfibres for smart paper through layer-by-layer nanocoating" *Nanotechnol.*, 17, 5319-5323 (2006). The thickness of the coating (including a $RuO_2$ coating), as defined above may be, but is not limited to, up to about 10 nm or 20 nm. The ratio of the diameter of the fiber to the thickness of the coating may be, but is not limited to, at least about 3, 5, 10, or 200 or higher. For example, a 100 nm diameter fiber might have a 20 nm coating.

$RuO_2$ may be deposited on articles, which may be fibers or non-fibers, by immersing the article in a solution of $RuO_4$ and a nonpolar solvent. The immersion is done at a temperature that avoids decomposition of $RuO_4$ in that solvent in the presence of the article. As $RuO_4$ may decompose at room temperature in solvents, the immersion may be cooled by a dry ice bath (about −78° C.) or in an aqueous ice bath (about 0° C.). The immersion may continue until the entire surface of the article or a sufficient amount of the surface of the article is wet with the solution.

Before the immersion, it may be desirable to equilibrate the article in the nonpolar solvent without the presence of $RuO_4$. This is performed at the same temperature as the immersion. By this method, the article is at the same temperature as the $RuO_4$ solution when it first contacts the article.

Once the immersion is complete, the article and solution are warmed to ambient temperature under ambient conditions. Ambient temperature includes, but is not limited to, room temperature, about 25° C., about 20 to about 30° C., and temperatures typically occurring in laboratory and manufacturing facilities with or without climate control. The warming occurs under ambient conditions, meaning that the warming need not be slowed by maintaining any cooling of the solution, nor hastened by direct heating of the solution by anything other than ambient air or objects in contact with the solution, article, or vessel containing them.

Suitable nonpolar solvents include, but are not limited to, a hydrocarbon solvent or petroleum ether. The solvent may be resistant to oxidation by $RuO_4$ and may be free of heteroatoms that may cause nucleation and growth of $RuO_2$ precipitates instead of coating the article.

The $RuO_4$ may be obtained in an aqueous solution, where it may be more stable than in a nonpolar solution. In that case, the $RuO_4$ may be extracted into the nonpolar solvent before immersing the article.

The nanoscale $RuO_2$ coating deposited throughout the electrode can be electrochemically addressable. It may be electrochemically and selectively modified with metal nanoparticle catalysts creating a composite membrane that can serve as a carbon- and ionomer-free gas diffusion electrode in a fuel cell. These composites may also be used as stand-alone, porous Li-ion insertion electrodes that are moldable for three-dimensional microbatteries, in which the electrode and electrolyte/separator phases are interpenetrated in three dimensions. It is also a practical and inexpensive material that can now attain the vaunted electronic and electrochemical properties of ruthenium oxide—high electronic conductivity, high capacitive charge storage, and fast electron transfer—by distributing the material at modest amounts on inexpensive, insulating substrates.

Having described the invention, the following examples are given to illustrate specific applications of the invention. These specific examples are not intended to limit the scope of the invention described in this application.

EXAMPLE 1

Strips of ~0.2-cm-thick silica fiber membranes (~3.5 cm×1 cm in geometric area, total mass 75 mg) were placed in clean petroleum ether in a flask held in a dry ice/acetone bath at −78° C. An aqueous solution of $RuO_4$ (10 mL of 0.5 wt % $RuO_4$) was extracted into ~20 mL of chilled petroleum ether, and then equilibrated with $SiO_2$ membranes at 78° C. for two days. (Hazard warning: $RuO_4$ is volatile and rapidly oxidizes skin—handle in a fume hood with standard protective gear.) The flask was then removed from the dry ice bath and warmed to room temperature under ambient conditions. On the basis of visible observations, the $RuO_4$ decomposed to $RuO_2$ as the flask warmed to room temperature. The flask was held at room temperature for >12 hr, then the petroleum ether was decanted off and the resulting composite was washed with several 100 mL aliquots of petroleum ether. Approximately 5-20 wt % of the Ru in solution was deposited onto the $SiO_2$ surfaces of the fibers that comprise the glass membrane, and the remainder of Ru in solution precipitated directly from solution as nanoscopic ruthenium oxide powder. It is possible to recover the precipitated $RuO_2$ and re-oxidize to $RuO_4$ with a strong oxidant such as potassium periodate and then extracted into an alkane such as pentane or petroleum ether for future depositions. This synthesis was successful on macroscopic substrates and may be scaled up to much larger substrates if desired.

The resulting composite was electrically conductive throughout based on two-point probe measurements, with a resistance of ~10 kΩ for a 0.2 cm-thick sample. The resistance decreased by four orders of magnitude by heating in flowing oxygen to 200° C. This mild heat treatment increased the area of contact between deposited particles and, based on analysis by TEM, converted the disordered, as-deposited ruthenium oxide into the more conductive, crystalline rutile $RuO_2$ form. The four-point conductivity of the annealed nanocomposite was on the order of 500 mS cm$^{-1}$ at room temperature in air.

Figure 1:
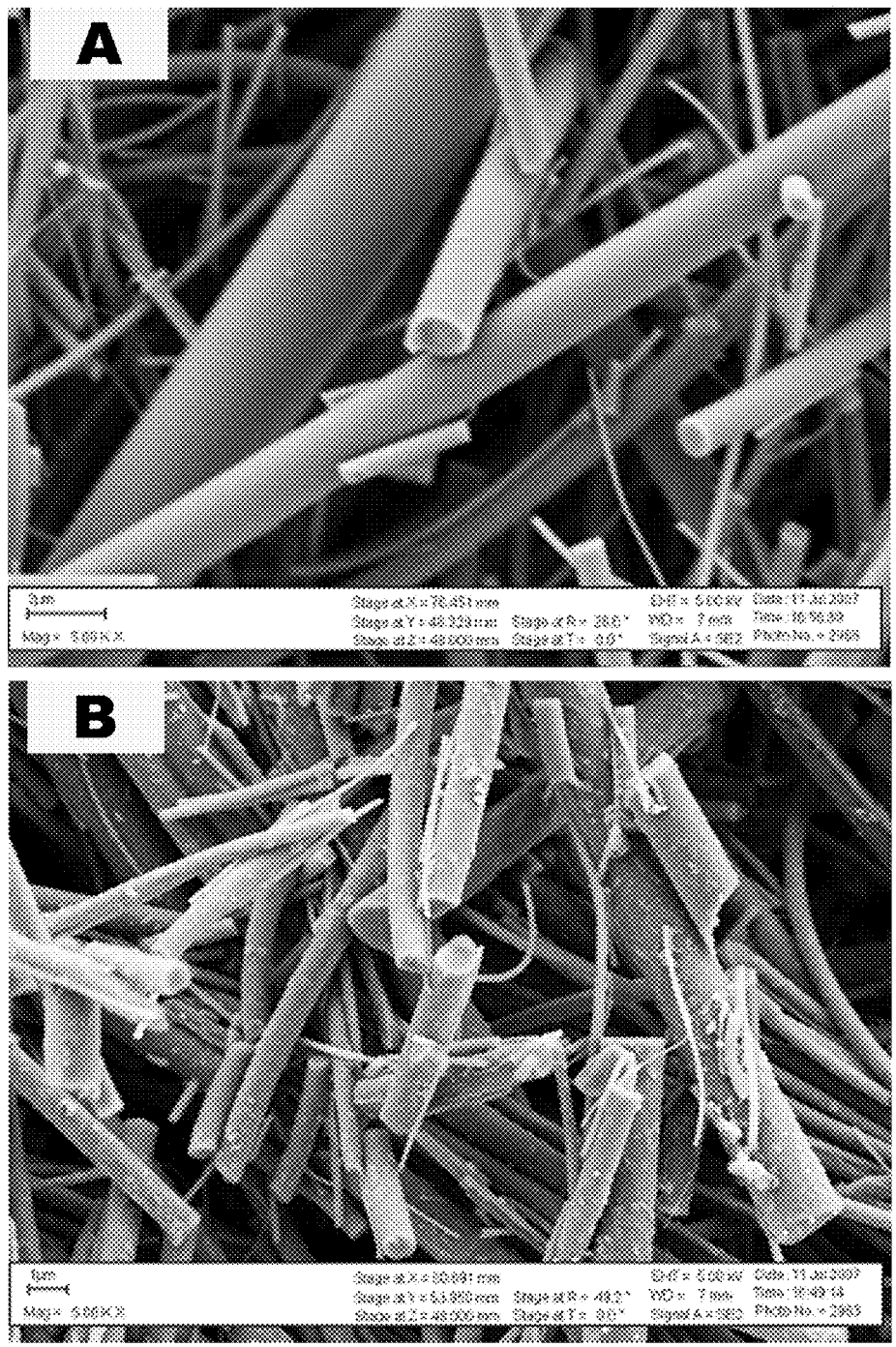
FIG. 1 shows scanning electron micrographs of (A) unmodified $SiO_2$ paper and (B) $RuO_2$-coated $SiO_2$ paper (designated herein as $RuO_2\|SiO_2$) after heating in air to 150° C. The $RuO_2$-modified glass paper had an increased surface roughness and some precipitated nanoparticles of $RuO_2$ can be observed. Because of the conductive electron contrast between $RuO_2$ (lighter) and $SiO_2$ (darker), the nanoscale coating of $RuO_2$ is apparent even at this magnification on some of the fibers.
Figure 2:
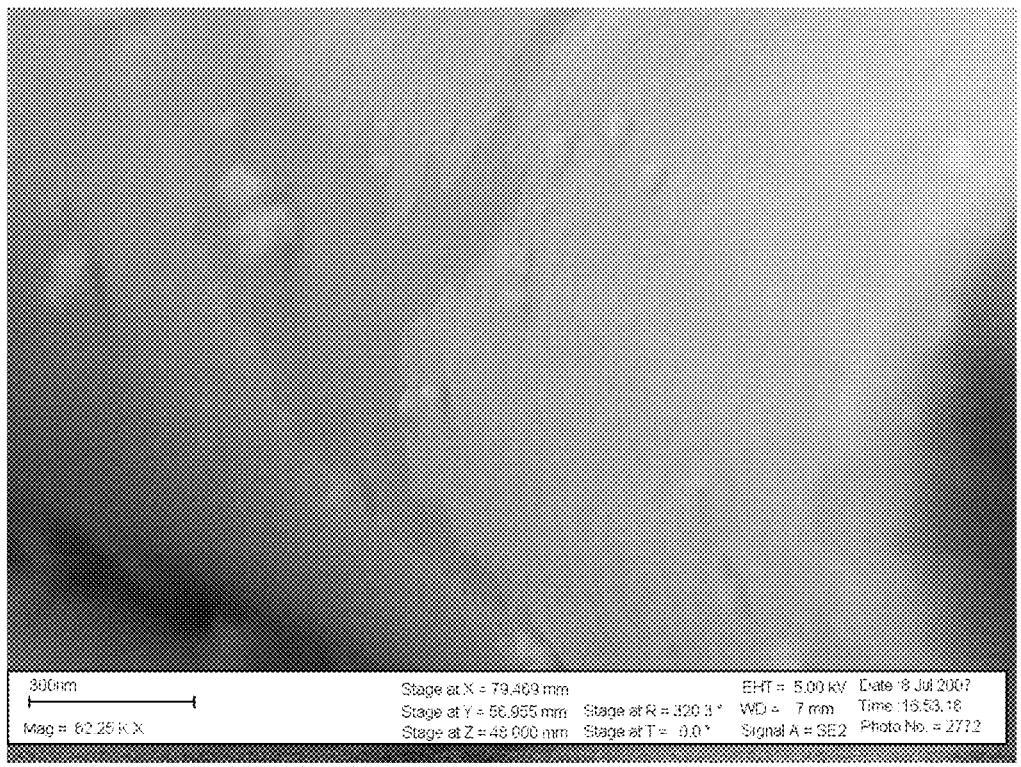
FIG. 2 shows a scanning electron micrograph of a $RuO_2\|SiO_2$ fiber calcined in air to 200° C. showing a nanoscale coating of $RuO_2$ on the fiber. The darker region is the $SiO_2$ fiber and the lighter regions are $RuO_2$. This image demonstrates that the cryogenically deposited $RuO_2$ forms a nanoscale coating around the fiber leaving only small portions of $SiO_2$ exposed.
Figure 3:
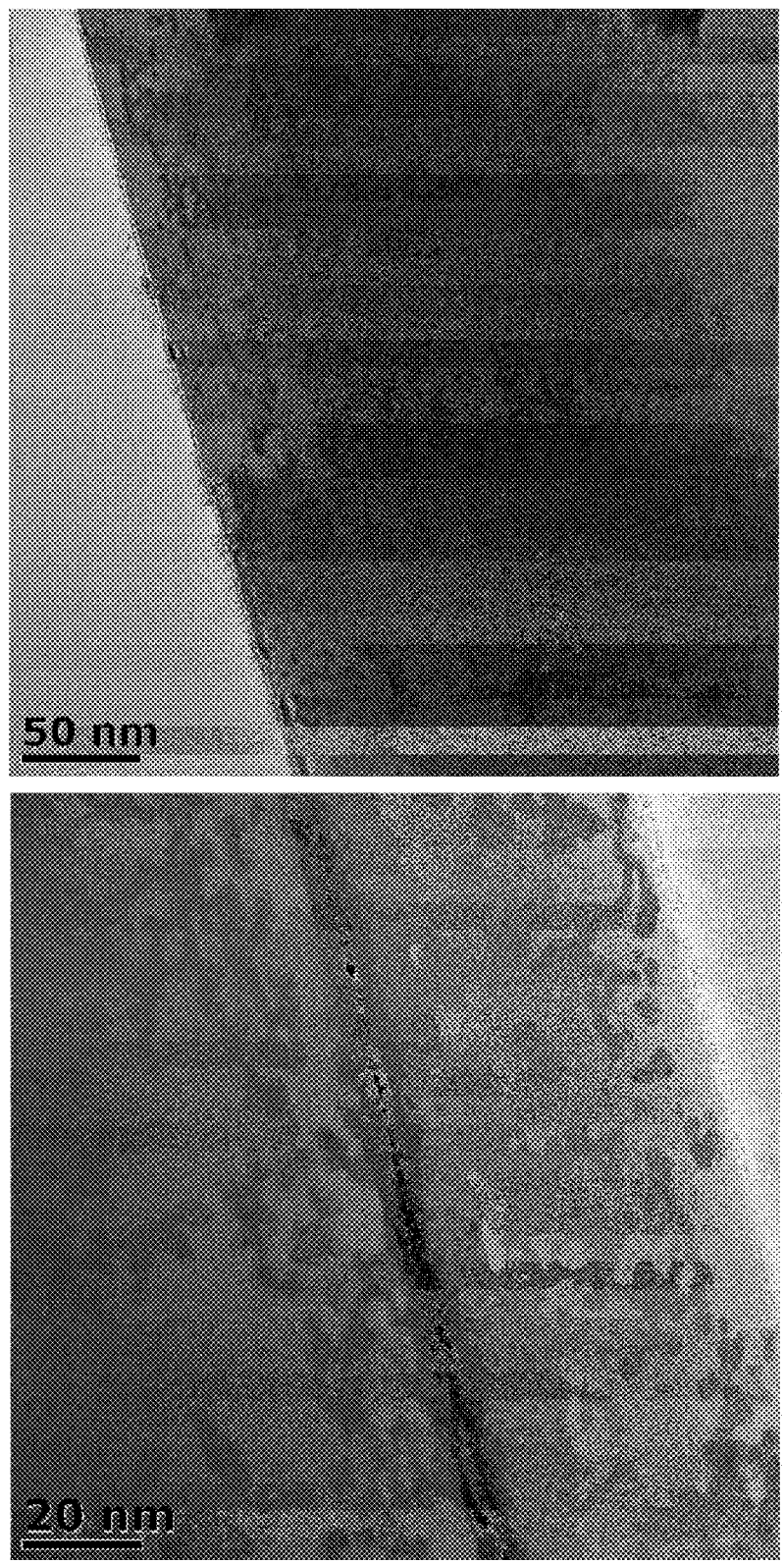
FIG. 3 shows a bright-field TEM (transmission electron microscopy) image of a $RuO_2\|SiO_2$ fiber calcined to 200° C. in which the $RuO_2$ is observed to form a nanoweb over the surface of the silica fiber. An interfilling of $RuO_2$ into the crevice formed where two silica fibers overlap on their edge can be observed in the rightmost micrograph.

A weight loading of 5-10% of $RuO_2$ was typically observed, by measuring the mass of the $SiO_2$ membrane before and after $RuO_2$ deposition. Scanning electron microscopy analysis of the $SiO_2$ membrane before and after deposition showed that the smooth surfaces of the $SiO_2$ fibers do not show significant morphological change after $RuO_2$ deposition and calcining to 150° C. (FIG. 1). Higher magnification micrographs of $RuO_2$-coated $SiO_2$ fibers revealed the presence of nanoscale $RuO_2$ coatings on the $SiO_2$ fibers and some $RuO_2$ precipitates (FIG. 2). The volume fraction of $RuO_2$ in the product was small, as no agglomerates are observed between the fibers. The TEM analysis confirmed the formation of a nanoscale coating of $RuO_2$ on the silica fibers and shows that these colloids nucleate into an interconnected nanoweb of $RuO_2$ (FIG. 3). The thickness of the 200° C.-calcined $RuO_2$ skin that coated the silica fibers was <10 nm as directly observed at higher magnification by taking advantage of the Z-contrast between Ru and Si to identify the $RuO_2$ phase where small breaks in the coating occurred. Because SEM analyzes only a small portion of the sample, numerous $RuO_2 \| SiO_2$ composites prepared under nominally similar conditions were imaged, confirming the reproducibility of the synthesis.

Figure 4:
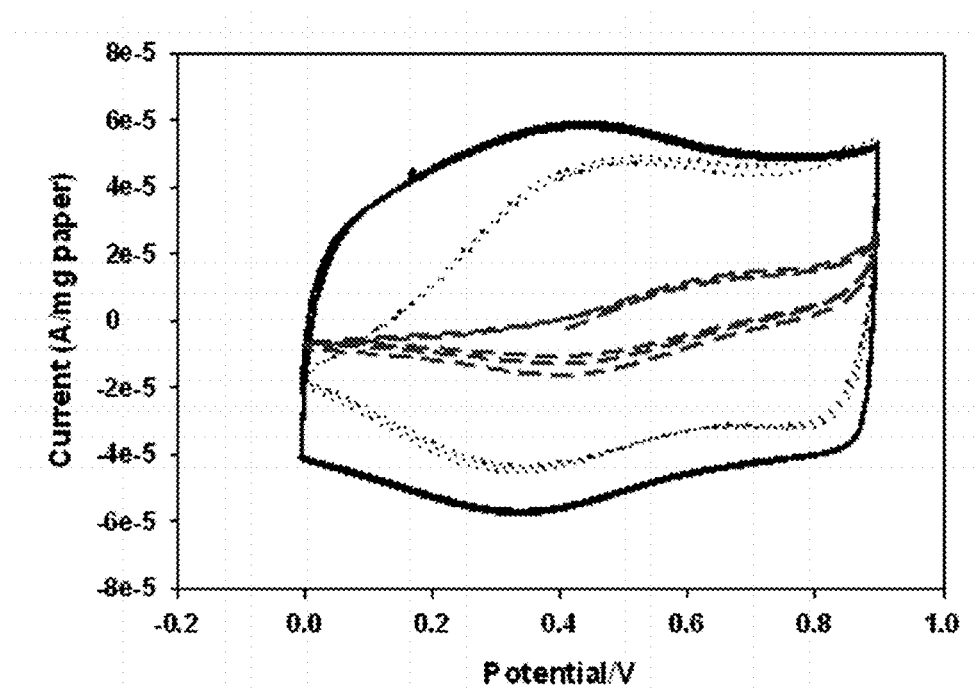
FIG. 4 shows the effect of calcining on the pseudocapacitance of ruthenia nanowebs supported on glass membranes.

The $RuO_2 \| SiO_2$ membranes, after calcining in air or oxygen, displayed pseudocapacitance similar to that of bulk hydrous ruthenium oxide ($RuO_xH_y$). FIG. 4 compares the cyclic voltammograms in sulfuric acid of composite membranes calcined at 100, 150, and 200° C. (in air). The currents are normalized to the mass of the membranes. Assuming a weight loading of 5 wt % $RuO_2$, the specific capacitance of $RuO_2$ in the 200° C. annealed sample was 650 F g$^{-1}$, which is on the same order of magnitude as specific capacitances determined for bulk $RuO_xH_y$ (Zheng et al., Hydrous ruthenium oxide as an electrode material for electrochemical capacitors. *J. Electrochem. Soc.*, 142, 2699-2703 (1995); Jow et al., Electrochemical capacitors using hydrous ruthenium oxide and hydrogen inserted ruthenium oxide. *J. Electrochem. Soc.*, 145, 49-52 (1998)). The high pseudocapacitance for $RuO_2\mu SiO_2$ membrane composites is attributed to the nanoscopic dimensions and high surface area of $RuO_2$, even though the bulk membrane structure has a relatively low surface area. Previous studies have shown that crystalline anhydrous $RuO_2$ powders (prepared by annealing hydrous $RuO_2$) have lower specific capacitances than hydrated forms (Dmowski et al., Local atomic structure and conduction mechanism of nanocrystalline hydrous $RuO_2$ from X-ray scattering. *J. Phys. Chem. B*, 106, 12677-12683 (2002)). Cryogenic or sub-ambiently prepared $RuO_2$ as bulk, nanoscopic powder or deposited on a silica membrane, is unique because it is both anhydrous and disordered. It crystallizes upon heating, remains anhydrous, and shows increasing specific capacitance with temperature up to 250° C.

EXAMPLE 2

Lightweight, flexible electrodes were prepared by cryogenic deposition of ruthenia onto silica fiber paper substrates (Pallflex tissuquartz, Pall Life Sciences). The $SiO_2$-fiber substrate, used commercially as a filter for sampling aerosols and acidic gases, had a thickness of ~0.4 mm and was composed of submicron-to-micron diameter fused $SiO_2$ fibers. Two 15 mL aliquots of petroleum ether (Fisher Scientific), prechilled for 1 min in a dry ice/acetone bath, were used to extract $RuO_4$ from a 10 mL aqueous solution (0.5 wt % solution, Strem Chemicals). The phase transfer was carried out in ~1 min in order to avoid decomposition of $RuO_4$ in the petroleum ether phase; the nonaqueous phase was collected in a flask held in a dry ice/acetone bath to allow any transferred water to freeze and settle out of solution. The nonaqueous solution was then decanted into a pre-chilled glass vial containing a rectangular strip of $SiO_2$ paper (4.5×3 cm, ~70 mg) immersed in ~10 mL of petroleum ether. The capped vial was chilled in the dry ice/acetone bath for 45 min allowing $RuO_4$ to equilibrate with the $SiO_2$ fibers, and then removed from the bath and held at room temperature overnight (~15 h). Decomposition of $RuO_4$ to $RuO_2$ occurred slowly, beginning within 15 to 20 min upon removal from the bath. The petroleum ether and precipitated $RuO_2$ were then decanted off, and the resultant $RuO_2\|SiO_2$ composite was washed with copious amounts of petroleum ether, air dried for 1 to 2 h and then dried under vacuum overnight.

Conductivity: The electrical resistance of an as-prepared $RuO_2\|SiO_2$ electrode was measured in-situ in air as a function of temperature from 25 to 300° C. in a two-probe cell. A 0.7×0.7 cm strip of $RuO_2\|SiO_x$ paper was sandwiched between two spring-loaded gold foil electrodes inside a quartz tube and heated with resistive tape powered by a Barnet Company temperature controller. Au leads were welded to the Au foil and fed to the instrument leads. A thermocouple placed next to the sample regulated the power supply ensuring accurate temperature control at the sample. Resistance was measured with a voltmeter at 25° C. intervals after the sample was held for 15 min at each temperature with the exception of 200° C. (2 h) and 300° C. (30 min). In one experiment, the sample was cooled to room temperature after measuring the resistance at 200° C. to verify that the increased conductivity upon crystallization is maintained upon cooling.

The geometric resistances at room temperature in air of $RuO_2\|SiO_2$ electrodes heated in air to 200° C. for 2 h were determined by the four-point probe method of van der Pauw. The electrodes were cut into strips ~1×0.7 cm and connected to copper wire leads with silver conductive epoxy (CW2400, Circuit Works). Current was applied with a Solartron SI1286 Electrochemical Interface and potential was measured with a voltmeter.

The as-prepared $RuO_2\|SiO_2$ composite was electrically conductive throughout with a two-point resistance of ~20 k$\Omega$. The conductivity as a function of calcination temperature, measured in situ from 25 to 300° C. (FIG. 5) increased sharply from 25 to 150° C. and plateaued at ~200° C. The four orders of magnitude increase in conductivity is consistent with conversion of poorly ordered, as-deposited $RuO_2$ into the more conductive crystalline rutile form (Ryan et al., *Nature*, 406, 169 (2000); Lytle et al., *J. Mater. Chem.*, 17, 1292 (2007)).

The 200° C.-calcined nanocomposite remained amorphous to X-rays, but exhibited lattice fringing in TEM analysis correlated to 2-3 nm ordered domains. Prolonged heating at 300° C. sharply decreased conductivity of the composite, which arose from dewiring of the $RuO_2$ network as the nanoskin of the $RuO_2$ coarsened. The conductivity measured at a given calcination temperature was maintained upon cooling to room temperature. In order to minimize coarsening and organic impurities while maintaining high conductivity, the thermal processing was limited to <280° C.

Despite the low weight loading of $RuO_2$ on the low surface area, macroporous $SiO_2$ paper, high macroscopic electronic conductivity was observed. The four-point conductivity of the 200° C.-calcined papers measured by four-point probe ranges from 0.3-0.7 S cm$^{-1}$ at room temperature in air (n=12, where each of the 12 samples derives from independent synthetic batches). This geometry-normalized conductivity does not completely express the remarkable behavior observed here because the $RuO_2$ occupies <0.1 vol. % of the electrode (to determine the volume fraction of $RuO_2$ the density of the $RuO_x$ phase was assumed to be 7.06 g cm$^{-3}$ (theoretical for $RuO_2$) and the wt % of $RuO_2$ in the sample (weight gain after calcination to 200° C.) taken to calculate the volume of $RuO_2$ and divide that by the geometric volume of the $RuO_2\|SiO_2$ paper.) The conductive phase was constrained to a skin of ruthenia that coated an insulating silica fiber, yet the nanoscale conductor mimicked a larger sized object. To highlight the oddity of this form of a well-studied metallic oxide, consider the density-normalized conductivity of $RuO_2$ in three forms: 50 S cm mg$^2$ (the porous $RuO_2\|SiO_2$ paper described here); 12 S cm$^2$ mg$^{-1}$ (as measured for a pressed pellet of cryogenerated $RuO_2$ powder calcined to 200° C.); and 14 S cm$^2$ mg$^{-1}$ (as calculated for polycrystalline $RuO_2$). (The nanoscopic 200° C.-calcined cryogenerated $RuO_2$ was pressed into a 1 cm×0.16 cm×0.17 cm pellet with a mass of 70.3 mg; the conductivity (four-terminal measurement) was divided by the geometric pellet density to obtain the density-normalized conductivity. For bulk $RuO_2$, we divide the known intrinsic conductivity of polycrystalline $RuO_2$ (~100 S cm$^{-1}$) by the theoretical density. For the $RuO_2\|SiO_2$ composite, we divide the measured conductivity (four-terminal measurement) by the density of $RuO_2$ in the composite.

To probe the mechanism of conduction, the temperature dependence of the conductivity of 200° C.-calcined $RuO_2\|SiO_2$ composites was examined using in-situ four-terminal measurements of resistance (FIG. 6). When the data are fit to an Arrhenius model, the electrical transport is consistent with an activated conduction process, although one with very low activation energy: 8 meV from 20 to 260° C. At temperatures below 20° C., the temperature dependence of the conductivity follows a power law, which may arise from the disjointed character of the electron connection between domains in the ruthenia nanoskin and between ruthenia domains across fibers. The growth of the nanoscale $RuO_2$ phase starts as a filigreed, networked coating on the individual fibers (verified by TEM imaging of the thinner silica fibers in the paper, FIG. 3). The ruthenia then appears to fill in on the wider fibers (FIG. 2), but junctions will still exist between wires and between individual nanocrystallites of $RuO_2$ that comprise the nanoskin. In keeping with the physically discrete nature of the nanoscopic domains of ruthenia, 200° C.-calcined $RuO_2\|SiO_2$ papers exhibit a negative temperature coefficient of resistivity (TCR), unlike the positive TCR expected of a metallic conductor and obtained for compacted $RuO_2$ powder (R. Sahul et al., *Sensors Actuators A* 125, 358 (2006). The change in resistivity with temperature for 200° C.-calcined $RuO_2\|SiO_2$ paper is negative over the entire measured range (−160 to 260° C.) with a TCR of −0.7 mΩ cm K$^{-1}$ derived from the linear portion from 20 to 180° C. Negative TCRs from 20 to 150° C. were previously observed for cracked, 1-2-µm-thick films of ruthenia and for compact films calcined at temperatures <500° C. with the apparent semiconducting process attributed to activated electron transport at film discontinuities (Lodi et al., *Surf. Technol.*, 14, 335 (1981)). The coefficients reported for the micrometer-thick films (on the order of 1 µΩ cm K$^{-1}$) are much lower than measured for the non-compact RuO$_2$ nanoskins.

Electrochemistry: All electrochemical measurements were made using a Solartron SI 1286 potentiostat on RuO$_2$∥SiO$_2$ composites calcined to 200° C. A gold foil with a gold wire welded to it was used as the electrical contact/support and a Pt mesh was used as the auxiliary electrode. The RuO$_2$∥SiO$_2$ composites were attached to the gold foil with an all-plastic paper clip and the gold wire was fed to the measurement lead. Measurements were conducted in a three-neck flask purged with Ar for ~30 min before the experiment and with Ar flowing over the solution during measurements.

The cyclic voltammetry of RuO$_2$∥SiO$_2$ paper was measured at ambient temperature in 0.5M H$_2$SO$_4$ at 2 mV s$^{-1}$ with a SSCE reference electrode. The response of an RuO$_2$∥SiO$_2$ composite electrode for the ferricyanide redox couple was measured in 1 M KNO$_3$ with 5 mmol K$_3$FeCN$_6$ at 5 mV s$^{-1}$ with a SCE reference electrode. Measurement of the double layer capacitance was made in acetonitrile with 0.1 M tetrabutylammonium perchlorate using a Ag/AgNO$_3$ reference electrode at 25 mV s$^{-1}$. In this case, the RuO$_2$∥SiO$_2$ was attached to a Pt wire contact with the all-plastic paper clip.

In addition to its many uses as an electronic material, RuO$_2$ is noted for its properties as an electrochemical catalyst, energy storage material, and electrode material that exhibits fast electron transfer kinetics (Rolison et al., *J. Electrochem. Soc.*, 126, 407 (1979)). A typical cyclic voltammogram in sulfuric acid for a 200° C.-calcined RuO$_2$∥SiO$_2$ composite (FIG. 7) exhibits the large proton capacitance (Zheng et al., *J. Electrochem. Soc.*, 142, L6 (1995)) characteristic of bulk hydrous ruthenium oxide (RuO$_x$H$_y$). The large capacitive and featureless constant current response observed over the potential window is due to reversible oxidation/reduction of surface sites with a concurrent exchange of protons and electrons (Zheng et al., *J. Electrochem. Soc.*, 142, 2699 (1995); Jow et al., *J. Electrochem. Soc.*, 145, 49 (1998)). The specific capacitance of the RuO$_2$∥SiO$_2$ composite, normalized for the mass of RuO$_2$ was 650 F g$^{-1}$, which is the same order of magnitude as disordered RuO$_x$H$_y$ (Zheng et al., *J. Electrochem. Soc.*, 142, L6 (1995)). The high specific capacitance demonstrates that a large portion of the deposited RuO$_2$ was electrically addressable and contributes to the observed electrochemical response.

Taking advantage of the effective wiring of the RuO$_2$ network, the surface area from the double-layer capacitance measured in an aprotic solvent (acetonitrile) with a bulky cation (tetrabutylammonium) can be calculated. The current response was featureless and capacitive in nature and from the capacitive envelope, and assuming a typical double-layer capacitance of 10 µF cm$^{-2}$, the surface area was determined to be ~90 m$^2$g$^{-1}$. For comparison, the surface area of cryogenically generated RuO$_2$ powder (calcined at 200° C.) is 30 m$^2$g$^{-1}$ as measured by N$_2$-sorption. The larger surface area achieved for the nanoscale RuO$_2$ coating is due to the significantly smaller domain size of RuO$_2$ on the SiO$_2$ fibers as compared with the precipitated, agglomerated nanoscopic powder.

The response of the RuO$_2$∥SiO$_2$ composite as an electrode for the ferricyanide redox couple was also studied. A typical voltammogram in 5 mM fenicyanide shows a reversible oxidation/reduction process with a peak separation of 76 mV (FIG. 8), demonstrating that the oxide captures the fast electron-transfer kinetics typical of this redox couple. These electrochemical results demonstrate that an electrochemically addressable high-surface area RuO$_2$ phase can be deposited on a very low surface area substrate producing a multifunctional electrode with extremely low weight loadings of RuO$_2$.

Microscopy: Scanning electron microscopy (SEM; Carl Zeiss Supra 55) was used to characterize the nanoscale RuO$_2$ coating on SiO$_2$. For analysis, the specimens were prepared by attaching a small portion of the composite to an aluminum stub with conductive carbon tape. A JEOL 2200FS transmission electron microscopy (TEM) equipped with a Gatan CCD camera and Noran System Six EDS was used to characterize the paper morphologies, confirm particle size and the nature of the coating, image lattice fringes, and elemental identification. For analysis, the specimens were prepared by dry-grinding then brushing the fibers/dust onto holey-carbon support Cu grids.

TEM: Surface area of bulk cryogenerated RuO$_2$ calcined to 200° C. was determined by nitrogen physisorption using a Micromeritics ASAP2010 accelerated surface area and porosimetry analyzer. The sample was degassed at 100° C. for 24 h prior to characterization.

In this RuO$_2$∥SiO$_2$ composite, the nanoscale RuO$_2$ phase made a networked coating (film) on the individual fibers but was likely to have junctions between wires or between individual nanocrystals of RuO$_2$. Individual wires of RuO$_2$ exhibited standard metallic conductivity but when taken as a whole, a very low activated process is observed related to wire-to-wire junctions.

The cost and strategic importance of the platinum group metals have always tempered their practical adoption in the vast array of technologies in which they would otherwise be used. We can now attain the vaunted electronic and electrochemical properties of ruthenium oxide—high electronic conductivity, high capacitive charge storage, and fast electron transfer—by distributing the material at modest amounts on dirt cheap, insulating substrates. The design strategy of forming closed nanoscale shells of charge-transport materials around curved substrates should be applicable as well to other technologically desirable but expensive materials.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. An article comprising:
   a nonconductive fiber comprising silica; and
   a RuO$_2$ film coating a portion of the fiber;
      wherein the article is free of aerogel.

2. The article of claim 1, wherein the article comprises an entangled plurality of the fibers.

3. The article of claim 2, wherein the plurality of fibers is in the form of a membrane or a fiber-formed paper.

4. The article of claim 1, wherein the RuO$_2$ forms an electrically connected network throughout the article.

5. The article of claim 4;
   wherein the plurality of fibers is a silica fiber membrane; and
   wherein the fibers are up to about 10 microns in diameter.

6. The article of claim 5, wherein the RuO$_2$ coating has an average thickness of up to about 10 nanometers.

7. The article of claim 5;
wherein the article contains up to about 10 wt % $RuO_2$; and
wherein the article has a bulk conductivity of at least about 500 mS cm$^{-1}$.

8. The article of claim 5, wherein the silica fibers are monofilaments.

9. The article of claim 5, further comprising:
a metal, metal oxide, polymer, molecular or ionic species, ceramic, or platinum deposited on portions of the $RuO_2$ coating.

10. A method comprising:
immersing a nonconductive article in a solution of $RuO_4$ and a nonpolar solvent at a temperature that is below the temperature at which $RuO_4$ decomposes to $RuO_2$ in the nonpolar solvent in the presence of the article;
wherein the nonconductive article is a silica fiber membrane; and
warming the article and solution to ambient temperature under ambient conditions to cause the formation of a $RuO_2$ coating on a portion of the article.

11. The method of claim 10, wherein the nonpolar solvent is a hydrocarbon.

12. The method of claim 10, wherein the nonpolar solvent is petroleum ether.

13. The method of claim 10, further comprising:
extracting the $RuO_4$ from an aqueous solution into the nonpolar solvent before immersing the article in the $RuO_4$ solution.

14. The method of claim 10, wherein the immersing temperature is maintained by a dry ice bath or aqueous ice bath.

15. The method of claim 10, further comprising:
equilibrating the article in an additional portion of the nonpolar solvent at the temperature before immersing the article in the $RuO_4$ solution.

16. The method of claim 10, further comprising:
depositing a metal, metal oxide, polymer, molecular or ionic species, ceramic, or platinum on a portion of the $RuO_2$ coating.

* * * * *